United States Patent [19]

Christ et al.

[11] Patent Number: 4,610,617

[45] Date of Patent: Sep. 9, 1986

[54] HEAT INSULATING PROTECTIVE SHIELDS FOR TWO-ROLL CALENDER WITH HEATED ROLLS

[75] Inventors: Alfred Christ, Zurich; Rolf Lehmann, Rudolfstetten, both of Switzerland

[73] Assignee: Sulzer-Escher Wyss AG, Zurich, Switzerland

[21] Appl. No.: 575,009

[22] Filed: Jan. 30, 1984

[30] Foreign Application Priority Data

Feb. 10, 1983 [CH] Switzerland .................... 749-83

[51] Int. Cl.⁴ .................................... B29C 43/24
[52] U.S. Cl. ........................... 425/143; 100/93 RP; 264/175; 425/194; 425/363
[58] Field of Search ............... 264/175; 29/113 AD, 29/116 AD; 425/194, 188, 79, 151, 363, 384, 138, 446, 407, 223, 224, 362; 100/162 R, 93 RP; 72/200

[56] References Cited

U.S. PATENT DOCUMENTS

| | | | |
|---|---|---|---|
| 1,022,617 | 4/1912 | Wintermeyer | 425/223 |
| 1,622,286 | 3/1927 | McIntosh et al. | 72/200 |
| 1,740,064 | 12/1929 | Boertlein | 425/223 |
| 1,745,891 | 2/1930 | Dimeo | 249/172 |
| 1,781,798 | 11/1930 | Williams | 72/200 |
| 2,882,554 | 4/1959 | Heck | 264/175 |
| 3,042,968 | 7/1962 | Kraszeski | 425/223 |
| 3,146,490 | 9/1964 | Cooney | 264/175 |
| 3,945,788 | 3/1976 | Inoue et al. | 264/175 |
| 4,025,272 | 5/1977 | Camp, III | 425/446 |
| 4,054,276 | 10/1977 | Wilson | 72/201 |
| 4,056,592 | 11/1977 | Izumi et al. | 264/175 |
| 4,114,528 | 9/1978 | Walker | 100/47 |
| 4,140,894 | 2/1979 | Katakura et al. | 219/388 |
| 4,154,078 | 5/1979 | Lehmann | 72/201 |
| 4,272,976 | 6/1981 | Pizzedaz | 72/201 |
| 4,317,026 | 2/1982 | Koblo et al. | 219/388 |
| 4,372,736 | 2/1983 | Gooch et al. | 264/175 |
| 4,462,852 | 7/1984 | Custor | 264/175 |

Primary Examiner—Jay H. Woo
Assistant Examiner—J. Fortenberry
Attorney, Agent, or Firm—Werner W. Kleeman

[57] ABSTRACT

The calender rolls of a calender are provided with heat insulating protective shields which can be laterally pivoted open and with heat insulating end covers or closures at the ends of the rolls. At least one of the rolls is provided with a blower device for generating air flows or jets which can be regulated over the length of such roll to equalize the temperature over the length of this roll.

9 Claims, 3 Drawing Figures

HEAT INSULATING PROTECTIVE SHIELDS FOR TWO-ROLL CALENDER WITH HEATED ROLLS

CROSS-REFERENCE TO RELATED APPLICATION

This application is related to the commonly assigned, copending U.S. application Ser. No. 06/575,010 filed Jan. 30, 1984, entitled "Calender for Pressure and Thermal Treatment of Material Webs".

BACKGROUND OF THE INVENTION

The present invention broadly relates to roll or calendering devices and, more specifically, pertains to a new and improved construction of a two-roll calender with heated calender rolls.

In its more specific aspects the roll or calendering device of the present invention relates to a two-roll calender having heated rolls for the pressure and thermal treatment of webs or sheet materials of plastic or textile or both, such as fiber webs.

In heretofore known two-roll calenders of this type the heated rolls are exposed to room or ambient temperature without heat or thermal insulation which leads to significant energy losses. These energy losses have the advantage, as far as they are uniform, that they have an equalizing effect on the temperature profile of the rolls and therefore guarantee a uniform quality of the sheet materials or webs produced, particularly with respect to their width. If the above-mentioned heat losses are prevented the required uniformity of the temperature profile over the length of the roll is no longer guaranteed.

SUMMARY OF THE INVENTION

Therefore, with the foregoing in mind it is a primary object of the present invention to provide a new and improved construction of a two-roll calender with heated rolls which does not have associated with it the aforementioned drawbacks and shortcomings of the prior art constructions.

Another and more specific object of the present invention aims at providing a new and improved construction of a two-roll calender with heated rolls of the previously mentioned type by means of which a substantial reduction in the thermal energy supplied to the rolls can be obtained without affecting the required uniformity of the temperature profile over the length of the rolls.

A further object of the invention is to provide a roll or calendering device wherein a cooling means acts in a gap or space formed between a roll member and a heat insulating protective shield to produce a cooling effect on the roll member which is adapted to equalize the temperature over the length of such roll member.

Yet a further significant object of the present invention aims at providing a new and improved construction of a two-roll calender with heated rolls which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the two-roll calender with heated rolls of the present invention is manifested by the features that both heated rolls are provided with heat insulating protective shields capable of being pivoted away from the related roll and with heat insulative end covers at the ends of the related roll. Moreover, at least one of the rolls is provided with a cooling device acting in a gap or space between such at least one roll and at least one of the heat insulating protective shields thereof to produce a cooling effect which can be regulated over the length of the roll for substantially equalizing the temperature.

Since the cooling device provided according to the invention only has to equalize minimal temperature differences, the use of the heat insulating protective shields results in a significant saving of heat or thermal energy.

The cooling device is preferably a blower device for generating air flows or jets which can be regulated over the length of the roll. The blower device is supplied with air at room or ambient temperature or air which has been heated by a suitable heating device. A very simple cooling device which is adequate for most cases is obtained by this measure.

The heat insulating protective shields are preferably pivotably mounted on the side of the roll which is located opposite to the contact pressure gap or nip. This arrangement provides optimal accessibility to the rolls by very simple means when the heat insulating protective shields are pivoted away from the rolls.

The blower device can also be disposed on the side of the roll located opposite to the contact pressure gap or nip in a space between two pivotable heat insulating protective shields. This arrangement provides a long region or path over which the air flows or jets can act on the surface of the roll in the gap or space between the roll and the related heat insulating protective shield. The blower device is also optimally accessible in this arrangement. The heat insulating protective shields can be provided with a layer of insulative material as well as a heat reflecting foil on the side facing the related roll. This foil is preferably easily replaced.

In a particularly simple embodiment, the blower device can be a housing having nozzle apertures or orifices disposed in at least one row and closable, individually or in groups, by means of sliding dampers, baffles or shutters or the like. It is to be understood that this blower device can also contain a longitudinal slot extending in the direction of the length of the related roll and whose width at different positions can be varied, as required, by any suitable means.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
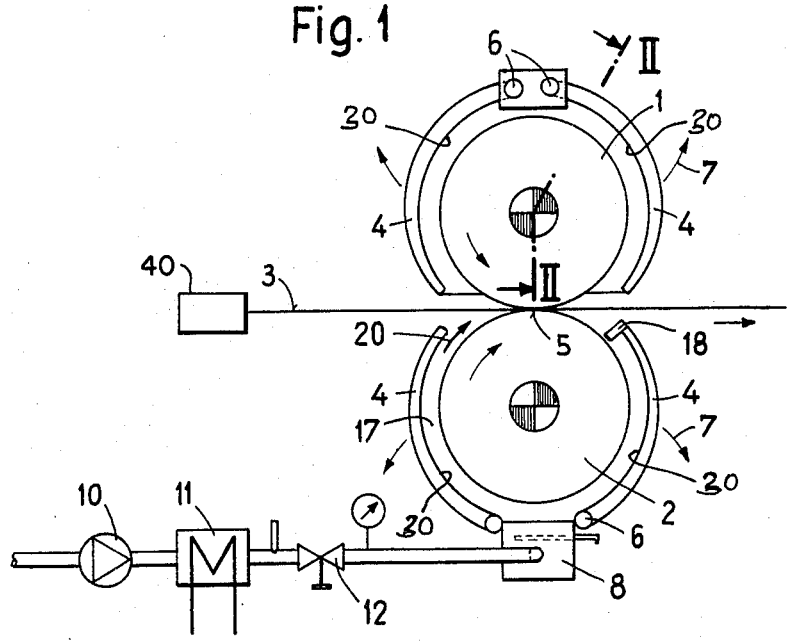
FIG. 1 is a schematic side view of the calender or calendering device according to the invention.

Describing now the drawings it is to be understood that to simplify the showing of the drawings only enough of the structure of the two-roll calender or calendering device has been illustrated therein as is needed to enable one skilled in the art to readily understand the underlying principles and concepts of this invention. The illustrated exemplary embodiment of the two-roll calender will be seen to comprise an upper calender roll 1 and a lower calender roll 2. In FIG. 1, the supporting framework or roll stand of the rolls has been omitted for reasons of clarity. Both calender rolls 1 and 2 are provided with conventional heating devices known per se and thus not particularly shown in the drawings. With these standard heating devices, the heating rolls 1 and 2 can be heated to a temperature of approximately 160° C. to 250° C. In operation, a sheet of material or web 3 of, for example, plastic or of textile, for instance a fiber web, that is to be subjected to pressure and thermal treatment is entrained and guided between the two coacting calender rolls 1 and 2 and fed into or through the contact pressure gap or roll nip 5 between these calendar rolls 1 and 2 by conventional web feed means, generally indicated in FIG. 1 by reference character 40. Both of these calender rolls 1 and 2 are provided with heat insulating protective shields 4, each of which contain a layer of insulative material as well as a heat reflective foil facing the surface of the related roll, for instance aluminum foil, as generally indicated by reference character 30.

As can further be seen from FIG. 1, the heat insulating protective shields 4 are pivotably mounted in hinges or pivot means 6 on those sides of the calender rolls 1, 2 located opposite to the contact pressure gap or nip 5. This arrangement permits the heat insulating protective shields 4 to be pivoted out of their service or operating position in the direction of the arrows 7.

Figure 3:
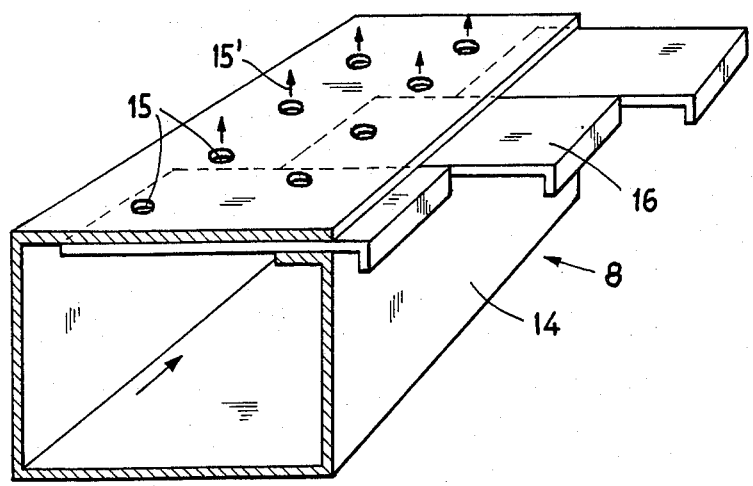
FIG. 3 is a schematic representation of a possible embodiment of the blower device.

The lower roll 2 in the calender of FIG. 1 is provided with cooling means comprising a blower device 8 which is shown on an enlarged scale in FIG. 3. As can be also seen in FIG. 1, the blower device 8 can be supplied with air by a fan or blower 10 or equivalent structure. The air can be conducted through a suitable heating device 11 which can be operated as required and through a regulating or control valve 12.

Figure 2:
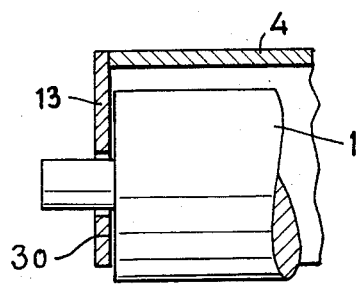
FIG. 2 is a schematic partial longitudinal section taken substantially at line II—II of FIG. 1.

FIG. 2 shows a partial section of the end zone or region of the upper calender roll 1 of FIG. 1. As can be seen from FIG. 2, the calender roll 1 has, in addition to the heat insulating protective shields 4 acting on its circumference, a heat insulating protective end cover 13 at each roll end. This end cover 13 is disposed as close as possible to the related lateral end face or surface of the calender roll 1 and is provided with the same insulative treatment and structure 20 as the heat insulating protective shields 4. It is to be understood that both ends of both rolls 1 and 2 are provided with such end covers 13.

According to the showing of FIG. 3 the blower device 8 comprises a housing or plenum chamber 14 whose length is relatively great in comparison to its other dimensions and whose upper side or wall is provided with nozzle apertures or orifices 15 disposed in two rows. These nozzle apertures or orifices 15 are adapted to form air flows or jets 15' directed against the surface of the corresponding roll, i.e. here the calender roll 2. The housing 14 is provided with sliding dampers or shutters 16 or equivalent structure for selectively closing and opening the nozzle apertures 15. These sliding dampers 16 or the like can, for instance, be adjusted by hand according to requirements in service. The nozzle apertures 15 of both exemplary depicted rows can be closed or the nozzle apertures 15 of one row can be open or the nozzle apertures of both rows can be open. Three sliding dampers 16 are represented in FIG. 3 illustrating each of the three positions mentioned above.

When the inventive calender or calendering device is in operation the heat insulating protective shields 4 are in the position shown in the drawings. This position greatly reduces heat losses for the rolls 1 and 2 to the ambient environment except at the processing or operating point in the region of the sheet of material or web 4 being processed. Unavoidable irregularities of the surface temperature of the calender rolls can be compensated by adjustment of the sliding dampers 16 of the blower device 8. The regulating or control valve 12 regulates the quantity of cooling air and the heating device 11 regulates its temperature. The greatest cooling effect is obtained when the regulating valve 12 is open and the heating device 11 is turned off. Throttling the regulating valve 12 or heating the air supply reduces the cooling effect.

The air flowing into the gap or space 17 between the insulative heat shields 4 and the calender roll 2 is directed towards the sheet of material or web 3 in whose proximity the gaps or spaces 17 terminate. Since the cooling effect is primarily required on that side of the calender roll 2 which is turning towards or inbound with respect to the contact pressure gap or nip 5, it is advantageous to close the gap or space 17 off between the heat insulating protective shield 4 and the calender roll 2 on the side of such roll downstream of the contact pressure gap or nip 5 by means of a closure strip or fixed baffle 18. The air current or flow is then concentrated mainly in the left-hand gap or space 17 of FIG. 1, whereby a further advantageous effect of this arrangement is achieved. The air warmed in the gap or space 17 and directed in the direction of the arrow 20 towards the sheet of material or web 3 can be employed to preheat such sheet of material or web 3 immediately before entering the contact pressure gap or nip 5. This has the effect that under otherwise identical conditions a reduced supply of heat to the contact pressure gap or nip 5 is required. Thus, for instance, the temperature of the calender roll 2 can then be lower which results in a further saving of energy.

While there are shown and described present preferred embodiments of the invention, it is to be distinctly understood that the invention is not limited thereto, but may be otherwise variously embodied and practiced within the scope of the following claims. Accordingly,

What we claim is:

1. A two-roll calender for the pressure and thermal treatment of material webs, comprising:
   two heated rolls forming therebetween a contact pressure gap through which passes a web of material undergoing processing;
   means for feeding said web of material through said contact pressure gap;
   each of said two heated rolls having a circumferential region and oppositely located end regions;
   heat insulating protective shields provided for each of said two heated rolls;
   means for pivotally mounted said heat insulating protective shields at said circumferential region of each of said two heated rolls so as to be capable of laterally pivoting away therefrom;
   heat insulating protective end covers mounted at said end regions of each of said two heated rolls;

cooling means provided for at least one of said two heated rolls;

said cooling means comprising a blower device capable of being supplied with air at a predetermined temperature to produce an air current which can be locally regulated over the longitudinal extent of said one roll; and said cooling means acting in a gap formed between said one roll and a related one of said heat insulating protective shields to produce a cooling effect on said one roll for substantially regulatably producing a predetermined temperature profile over said longitudinal extent of said one roll.

2. The two-roll calender as defined in claim 1, wherein:

said cooling means further comprise:
a heating, device; and
said blower device being capable of being supplied with air at ambient temperature or air heated by said heating device to produce said air current which can be regulated over the longitudinal extent of said one roll.

3. The two-roll calender as defined in claim 1, wherein:

said heat insulating protective shields are pivotably mounted by said mounting means at a side of said one roll located opposite said contact pressure gap.

4. The two-roll calender as defined in claim 3, wherein:

said blower device is disposed between two of said heat insulating protective shields on a side of the one roll located opposite the contact pressure gap.

5. The two-roll calender as defined in claim 1, wherein:

said heat insulating protective shields each contain a layer of insulative material and a heat reflective foil disposed in facing relationship to said rolls.

6. The two-roll calender as defined in claim 1, wherein:

said blower device further comprises:
a housing;
nozzle apertures arranged in at least one row in said housing; and
at least one sliding damper capable of selectively closing-off said nozzle apertures independently or in groups.

7. The two-roll calender as defined in claim 1, wherein:

said two rolls define a direction of processing said web of material;
said heat insulating protective shields comprising at least one heat insulating protective shield provided for said one roll and located on a side of said one roll subsequent to said contact pressure gap as seen in said direction of processing; and said at least one heat insulating protective shield being provided with a closure strip in the region of said contact pressure gap for restricting outflow of said air current and thereby augmenting said air current on an opposite side of said one roll.

8. The two-roll calender as defined in claim 7, wherein:

said heat insulating protective shields comprise at least one further heat insulating protective shield provided for said one roll and located on said opposite side of said one roll;

said at least one further heat insulating protective shield being configured to guide said air current around said circumferential region of said one roll along said opposite side for producing said cooling effect; and said at least one further heat insulating protective shield opening in the region of said contact pressure gap for producing a pre-heating effect upon said web of material at a location preceding said contact pressure gap as seen in said direction of processing of the web of material.

9. A roll device, comprising;

two coacting heated roll members forming a roll nip therebetween;

means for feeding a web of material through said roll nip;

each of said roll members having a circumferential region and two end regions;

heat insulating protective shields pivotally mounted at said circumferential region of each of said two roll members to pivot away therefrom;

heat insulating protective end covers mounted at said end regions of each of said two roll members;

cooling means cooperating with at least one of said two roll members;

said cooling means comprising a heating device;

said cooling means further comprising a blower device;

said blower device being capable of being selectively supplied either with air at ambient temperature or with air heated by said heating device to produce an air current which can be regulated over a longitudinal extent of said one roll member; and said cooling means being effective in a gap formed between one of the roll members and a related one of said heat insulating protective shields to produce a cooling effect on said one roll member for substantially regulatably equalizing the temperature thereof over a longitudinal extent of said one roll member.

* * * * *